Aug. 17, 1926.

R. CRAIG

TURNTABLE

Filed April 24, 1926

1,596,156

Inventor
Robert Craig
By Cooper, Kerr & Dunham,
Attorneys

Patented Aug. 17, 1926.

1,596,156

UNITED STATES PATENT OFFICE.

ROBERT CRAIG, OF DAYTON, OHIO.

TURNTABLE.

Application filed April 24, 1926. Serial No. 104,274.

This invention pertains to turntables such as are used in public and private garages for turning automobiles.

In certain garages, for instance those of the long narrow type, it is advantageous to have a turntable which may be moved back and forth through a central aisle so that it may be placed in front of any particular parking space or stall in order to assist in moving an automobile from stall to aisle, or vice versa.

Such turntables are commonly called transfer turntables, and that is the class of machine to which my present invention belongs, being an improvement in the turntable disclosed in my Patent No. 1,237,022, issued August 14, 1917.

That turntable is of the pitless type, adapted for installation entirely above the floor, and comprises a frame to which are attached runways or pans for the vehicle wheels, the machine being provided with wheels which permit its rotation about a central pivot.

The present invention provides the above pitless turntable with a set of auxiliary wheels by means of which the whole machine may be transferred bodily to the position where it is to be used. The auxiliary wheels are manipulable by a hand lever, and means are provided to automatically control the central pivot to cause it to engage the floor when the machine is to function as a turntable and to rise out of contact with the floor when the machine is to be transferred to a new position. Preferably the machine is transferred on rails set into the floor.

Further and other objects and advantages will be hereinafter set forth in the accompanying specification and claims, and shown in the drawings, which by way of illustration show what is now considered to be the preferred embodiment of the invention.

Fig. 1 is a plan view of the complete machine.

Fig. 2 is a sectional view on the line 2—2 of Fig. 1, with the turntable wheels on the floor, the transfer wheels being off the floor.

Fig. 3 is an enlarged sectional view on line 3—3 of Fig. 1, with the transfer wheels on the floor and the turntable wheels off the floor.

Figure 1:
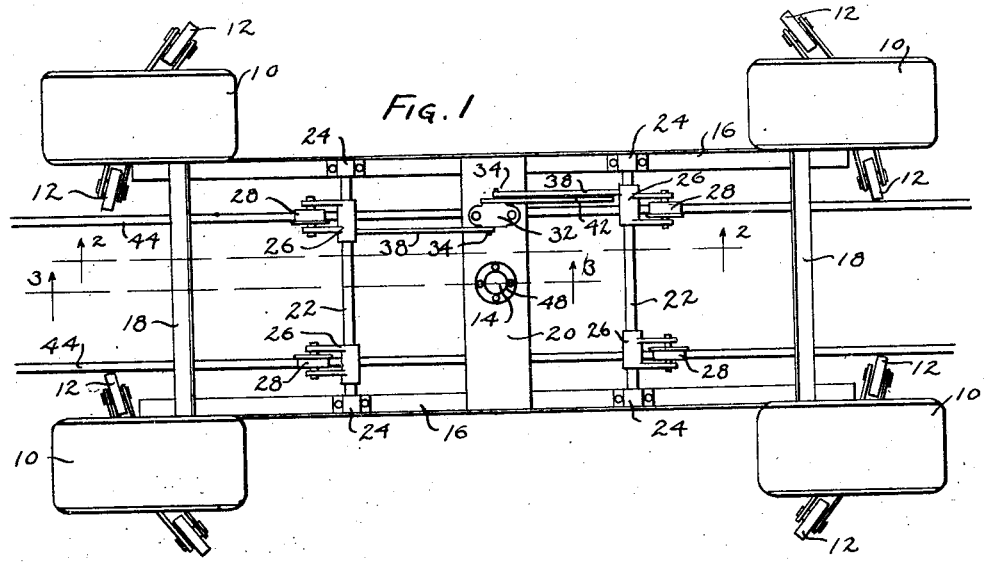

The turntable proper comprises four shoes or pans 10, each mounted on a pair of wheels
12. The wheel axes are on radial lines drawn to the floor at the center of the turntable pivot which is designated generally as 14. The rims of the wheels are frustums of cones tangent to the floor surface, therefore they roll easily on the floor, without any sliding contact.

The shoes 10 are fastened to a frame comprising longitudinal angle members 16, cross angles 18, and central plate 20, all bolted or riveted together.

Pivot device 14 is secured to plate 20. The transfer mechanism comprises two cross shafts 22 mounted for rotation in bearings 24 fast to side angles 16. Fast on each shaft 22 are two members 26, each having two projecting arms which provide support for the axle of one of the four transfer wheels 28. Projecting downwardly from each member 26 is an arm 30. Mounted on plate 20 is a bearing 32 in which is carried an eccentric device comprising a shaft 36 having on each end a pin 34, the two pins being diametrically opposite each other. Each pin 34 is connected by a link 38 to a pin 40 in one of the depending arms 30.

Figure 2:
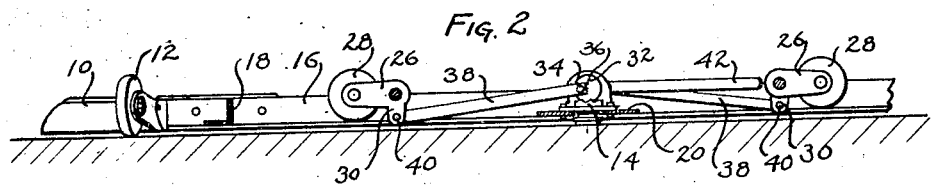
Figure 3:
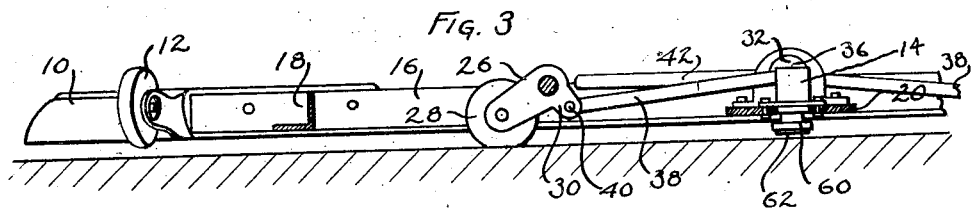

Secured to one end of the shaft 26 is a hand lever 42, arranged to be moved from the position shown in Figs. 1 and 2 to a position diametrically opposite as in Fig. 3.

Figure 4:
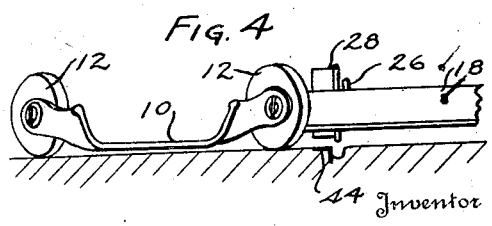
Fig. 4 is an end view of one of the shoes, with its wheels, together with a portion of the frame, and a transfer wheel.

It will be observed that in Figs. 2 and 4 the turntable wheels 12 rest on the floor and transfer wheels 28 are well out of contact with the floor or truck, in which position the turntable may be rotated. In Fig. 3, however, lever 42 has been moved, links 38 have been drawn toward the center of the machine, arms 30 and shafts 22 have been rotated, and wheels 28 have been forced downwardly until the turntable wheels 12 are clear of the floor. With the parts in this position the whole machine may be moved from place to place on wheels 28, preferably on rails 44 set with their tops flush with the floor.

The arrangement of lever 42 and links 38 is such that lever 42 is self-locking in either of its operative positions and no latch device is required to prevent inadvertent movement of lever 42, the line of thrust or tension of links 38 being always below the center of discs 34, and tending to hold the parts in locked position.

When the machine is functioning as a turntable it is desirable to have the pivot in contact with the floor in order that the turntable wheels 12 will roll in a true circle, and in order that the transfer wheels 28 will be brought back to register with the rails after the rotation of the turntable is completed. However, when the machine is to be transferred on wheels 28 it is necessary that the pivot be out of contact with the floor, otherwise the machine could not be moved, except to rotate it.

Figure 5:
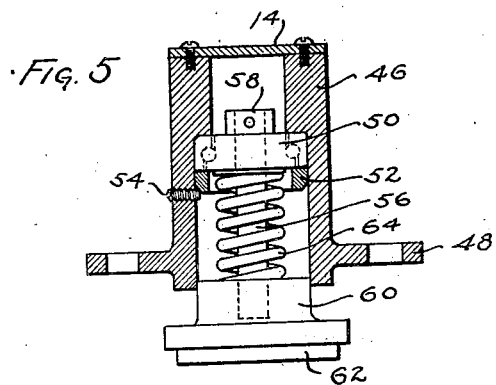
Fig. 5 is an enlarged sectional view of the turntable pivot.

Engagement and disengagement of the pivot is accomplished by the device shown in Fig. 5, which comprises a hollow housing casting 46 having a flange 48 which is bolted to plate 20. Contained within housing 46 is a ball bearing 50 confined between a shoulder formed in casting 46 and a collar 52 held in position by one or more screws 54. Passing freely downwardly through the center of bearing 50 is a vertical stem 56, having a collar 58 pinned to its upper end, and a flanged plug 60 fast on its lower end, the bottom surface of plug 60 being faced with a rubber or fibre pad 62. Between bearing 50 and plug 60 is a coil compression spring 64. Plug 60 is an easy sliding fit in housing 46.

Whenever the turntable is in the position shown in Fig. 2, ready for rotation, pad 62 is in contact with the floor, and plug 60 has been forced upwardly against spring 64. It is evident that by adjusting the stiffness of spring 64, any desired pressure may be applied to pad 62, limited only by the weight of the entire machine. Pad 62 is always automatically pressed into contact with the floor when the machine is arranged for rotation, and holds the machine on a fixed center during rotation.

Since flange 48 is fast to center plate 20, it is raised or lowered whenever the turntable is raised or lowered. The vertical travel of plug 60 is limited by collar 58, that is, when housing 46 is raised with plate 20 by the action of hand lever 42, pad 62 will remain in contact with the floor until collar 58 rests on bearing 50, whereupon any further vertical upward movement of housing 46 will raise pad 62 clear of the floor, as shown in Fig. 3, in which position of pad 62 the machine is free to be transported on wheels 28. This action takes place automatically whenever hand lever 42 is moved to transfer position, that is, to the position shown in Fig. 3.

As wheels 12 roll on the floor, without a metal track between wheels and floor, I usually provide the wheels with rubber or fibre cushion rims to prevent injury to the floor.

It is to be understood that the invention is not limited to the construction herein specifically illustrated but can be embodied in other forms without departure from its spirit.

I claim—

1. A machine for moving vehicles, comprising in combination, a vehicle support, means attached to said support for rotating it on a floor, means attached to said support for transporting it bodily on the floor, devices shiftable to render either said rotating or transporting means operable and at the same time render the other means non-operable, and a resilient pivot device arranged to automatically engage the floor when said rotating means becomes operable, and to release the floor when said rotating means becomes non-operable.

2. A machine for handling vehicles, comprising in combination, a set of turntable wheels, shiftable means to place said wheels in operative or non-operative position on a floor, a device for guiding said wheels while in operative position, and automatic means to render said guiding device effective whenever said wheels are placed in operative position said guiding device comprising a member arranged to make resilient contact with the floor while in effective position.

In testimony whereof I hereto affix my signature.

ROBERT CRAIG.